United States Patent [19]

Cruickshank

[11] Patent Number: 4,800,104

[45] Date of Patent: Jan. 24, 1989

[54] METHOD AND APPARATUS FOR THE INSPECTION OF TUBULAR MEMBERS

[75] Inventor: John S. Cruickshank, Inchture, Scotland

[73] Assignee: The L.B.P. Partnership C.P.I. Corporation, St. Louis, Mo.

[21] Appl. No.: 20,323

[22] Filed: Feb. 27, 1987

Related U.S. Application Data

[63] Continuation-in-part of Ser. No. 786,322, Oct. 10, 1985, abandoned.

[30] Foreign Application Priority Data

Oct. 12, 1984 [GB] United Kingdom ............... 8425870

[51] Int. Cl.⁴ .................. B05D 7/22; B24C 3/00; B05C 11/00; B24B 7/00
[52] U.S. Cl. .................................. 427/230; 51/2 A; 51/5 A; 51/411; 51/410; 118/72; 118/314; 118/306; 118/317; 118/326; 118/500; 118/503; 427/9; 427/10; 427/239; 427/299; 427/327; 427/348
[58] Field of Search ............... 427/230, 239, 9, 10, 427/292, 348, 327, 299; 118/72, 314, 306, 326, 500, 503, 317, DIG. 10, 713; 51/5 R, 2 A, 411, 410

[56] References Cited

U.S. PATENT DOCUMENTS

| 3,034,729 | 5/1962 | Gray et al. | 239/15 |
| 4,036,173 | 7/1977 | Nicklas | 118/306 |
| 4,096,300 | 6/1978 | William et al. | 427/292 |
| 4,178,875 | 12/1979 | Moschetti | 118/713 |
| 4,218,989 | 8/1980 | Fujita et al. | 118/713 |
| 4,249,475 | 2/1981 | Lindsey | 118/105 |
| 4,308,824 | 1/1982 | Muta et al. | 118/713 |
| 4,369,713 | 1/1983 | Richardson | 104/138 R |
| 4,371,569 | 1/1982 | Muta | 118/713 |

FOREIGN PATENT DOCUMENTS

2000301 6/1978 United Kingdom .
2014317 2/1979 United Kingdom .

Primary Examiner—Janyce Bell
Attorney, Agent, or Firm—Ladas & Parry

[57] ABSTRACT

A method of inspecting the inner and/or outer circumferential surface of a tubular member includes the steps of moving an inspection apparatus along the tubular member and during movement along the member sequentially cleaning the inner and/or outer circumferential surface and optically scanning the entire 360° of the inner and/or outer circumferential surface of the elongate member. The foregoing steps are performed in a single forward pass of the inspection apparatus along the tubular member and in a return pass the tubular member is applied with a corrosion preventing material which in the return pass is dried. An apparatus for performing the method is disclosed and the apparatus is capable of determining dimensional faults and inspecting for, inter alia, cavitation, reeding and scale inclusion.

34 Claims, 7 Drawing Sheets

METHOD AND APPARATUS FOR THE INSPECTION OF TUBULAR MEMBERS

This application is a continuation in part of Ser. No. 786,322 filed Oct. 10, 1985, now abandoned.

BACKGROUND OF INVENTION

This invention relates to a method and to an apparatus for the inspection of tubular members such as pipes and tubes and the inspection apparatus is of the type which may be used either prior to the installation of the tubular member or after the installation of the tubular member.

DESCRIPTION OF PRIOR ART

Tubular members which in use are subjected to strain, pressure, tension, temperature, or corrosive attack, are required to meet specific standards and it is desirable that defects such as corrosive attack on the wall surfaces, wall thinning during drawing, ovality, and internal wall faults such as cavitation, reeding, or scale inclusion, are discovered, if present, prior to installation, particularly where the installation is to be below the surface of the Earth or in an environment hostile to man.

In U.S. Pat. No 4,096,300 (William et al) there is disclosed a portable automated coating plant for coating metal members such as I-beams in which the member to be coated is passed through the apparatus and passes respectively through a cleaning section, an anticorrosive coating section and a drying section. The difficulty found with the apparatus of the U.S.A. Patent is that it is unable to inspect the member for dimensional faults or for cavitation, reeding or scale inclusion. Moreover the Williams et al Patent is unable to inspect or clean or coat the inside of a member and the disclosure is applicable only to the cleaning, coating and drying of the external surfaces of a metal member.

It is however known to inspect the inside of a pipe and to coat the inside of the pipe from U.S. Pat. No. 2,998,800 (Vernooy). In the inspection apparatus of Vernooy a flaw on the inside of a pipe is detected by spaced apart rows of spring fingers with the fingers in each row spaced circumferentially around the inside of the pipe and the fingers are arranged to close an electrical circuit when a flaw in the pipe is found. The disadvantage of using spring fingers is that only about twenty five percent of the inner circumference of a pipe is inspected since the fingers are spaced apart and each finger has a finite width so that flaws smaller than the width of a finger or between the fingers remain undetected. Vernooy also discloses coating the inside of a tubular member but does not disclose any means of cleaning the inside of said member.

In both William et al and Vernooy it is not possible to inspect the outside of a tubular member and neither reference is able to detect dimensional inaccuracies in wall thickness or detect for ovality. It is a principal object of this invention to provide a method and an apparatus for inspecting the entire circumference of a tubular member and it is a further object to inspect both the inside and the outside of a tubular member and to determine dimensional inaccuracies in the walls of a member.

In the oil production industry there has occurred unexpected failures in downhole pipes even in circumstances where the tubular members have been previously unused and where on manufacture they were checked to conform with manufacturing specifications. On investigation it has been found that a principal cause of the problem is the incidence of corrosion under the protective coating of the tubular member during pre-use storage. The present inventor has found that the problem has arisen often as a consequence of the physical size of the tubular members. In this respect the normal pre-installation cleaning processes and the process of applying corrosion inhibitors such as those set down in the American Petroleum Institute (API) Standards have not occurred simultaneously or not at the same location. One of the consequences of cleaning the piping and treating them with inhibitors at different times is that an already cleaned surface becomes contaminated or damaged prior to applying the inhibitor. Moreover it is usual to treat the inside surface of a pipe at a different time to the outside surface. Such a procedure also tends to cause corrosion problems.

While various methods and apparatus currently exists to carry out individual functions or dual functions, no equipment is believed to exist which can carry out the multiplicity of functions necessary to ensure the comprehensive cleaning, inspection and the application of protective coating to tubular members in a unitary operation. It is accordingly a further object of this invention to provide a method and apparatus for inspecting and treating at least one of the entire circumferential surfaces along the length of a tubular member, i.e. the inside and/or outside surface of a tubular member in a unitary (continuous) operation.

According to one aspect of this invention there is provided a method of inspecting at least one of an inner circumferential surface and an outer circumferential surface of an elongate tubular member including the steps of:

(a) moving an inspection apparatus along said tubular member, and during movement therealong said inspection apparatus in a single operation sequentially (b) cleaning said at least one of the inner circumferential surface and the outer circumferential surface of the elongate tubular member and (c) optically scanning the entire circumference of at least one of the inner circumferential surface and the outer circumferential surface of the elongate tubular member that was cleaned during step (b).

Preferably the steps (a)–(c) are performed in a single forward pass along said tubular member and conveniently the step (c) is an electro-optical scanning process.

Where access to the external surfaces of the tubular member is possible, advantageously the tubular member is secured upon support means and said inspection apparatus simultaneously cleans both the inner and outer circumferential surfaces of said tubular member as said inspection apparatus moves therealong and the step of electro-optically scanning is performed simultaneously on opposed sides of the tubular member wall for effecting comparison checks where at least one of ovality and wall thickness deviation are to be determined.

Conveniently in a return pass of the inspection apparatus it applies a corrosion preventing material and dries said material on at least one of the inner circumferential surface and the outer circumferential surface of said elongate tubular member.

Preferably the inspection apparatus includes means for ultrasonically testing the tubular member and said ultra-sonic testing is effected concurrently with at least one of steps (b) and (c).

According to a feature of said one aspect, in a method of inspecting and treating an elongate tubular member such as production pipe sections used for oil or gas wells, the improvement comprising the progressive zonal inspection and treatment along the length of at least one of an internal surface and an external surface of the tubular member such that the entire inspection and treatment is carried out in one cycle of operation by an inspection and treating apparatus, said cycle including a forward pass and a return pass along said member by motion of said inspection and treating apparatus therealong, said cycle during said forward pass of said inspection and treating apparatus comprising cleaning the member over at least one of the inner circumferential surface and the outside circumferential surface and inspecting the member over the entire circumference of at least one of the inner circumferential surface and the outer circumferential surface by viewing the member with an inspection device, said cycle during said return pass of said inspection and treating apparatus comprising coating the member with a corrosion preventive material and drying the coated member.

In said feature preferably said treatment is carried out simultaneously on the internal and external wall circumferential surfaces of the member within the same zone.

Advantageously the step of cleaning the tubular member comprises blasting with abrasive particles followed by the removal of dust and loose particles by forced air jets.

Conveniently the step of drying includes heating air before it impinges on the tubular member.

Preferably in said feature the step of inspecting the tubular member includes at least one of the processes of circumferential video profile inspection circumferential video profile measurement and circumferential ultrasonic scanning.

According to another aspect of this invention there is provided an apparatus for inspecting at least one of an inner circumferential surface and an outer circumferential surface of an elongate tubular member including an inspection apparatus arranged to be movable along said tubular member and comprising cleaning means for cleaning at least one of the inner and outer circumferential surface of said tubular member and an optical scanning means for viewing the entire circumference of said at least one of the inner and outer circumferential surface immediately following cleaning by said cleaning means, whereby said apparatus is adapted to effect the method of said one aspect.

Conveniently the optical scanning means is an electro-optical scanning means.

Preferably the cleaning means and the electro-optical scanning means are each arranged to be operative during a single forward pass of the inspection apparatus along said tubular member.

Advantageously the tubular member is secured upon a support means and said inspection apparatus comprises separate cleaning means respectively on the inside and the outside of said tubular member to simultaneously clean the inner and outer circumferential surfaces of said tubular member as the inspection apparatus moves therealong and separate electro-optical scanning means are provided on each of the inside and the outside of said tubular member whereby the inside entire circumferential surface and the outside entire circumferential surface of the tubular member are viewable, and means are provided for effecting comparison checks for determining at least one of ovality and wall thickness deviation.

Conveniently the inspection apparatus further comprises means for applying a corrosion preventative material and a drying means whereby on a return pass of the inspection apparatus the corrosion preventing means and the drying means are operative.

Advantageously a corrosion preventing applying means and a drying means are locatable respectively on the inside and the outside of said tubular member.

Advantageously the inspection means further comprises an ultrasonic testing means for detecting flaws in the wall of the tubular member.

Preferably the inspection apparatus comprises a probe for insertion into the tubular member, said probe having guidance means for centering the probe in the tubular member and said probe having in discrete compartments therealong the cleaning means for the interior surface of said tubular member, the means for applying a corrosion preventing material to the inner surface of said tubular member, air drying means, and said electro-optical scanning means. Advantageously an ultra-sonic testing means has an ultra-sonic generator located in the probe.

Conveniently the electro-optical scanning means located in the probe comprises a light means and an associated reflective means arranged to illuminate a circumferential strip of the inside circumferential wall of said tubular member, and a plurality of viewing means arranged to view the entire circumference of the circumferential strip of wall illuminated by said light means. Conveniently the light means is a laser and the viewing means are video cameras.

Advantageously said probe has a plurality of extendable arms for support centrally within tubular members of varying internal diameters and an expandable and retractable telescopic tubular member at one end of said probe for communicating with a service unit external of said tubular member, wherein said probe is connected to said service unit through an umbilical cable which passes through said telescopic tubular member. Conveniently the service unit includes a drum for storing sections of the umbilical cable not transferred to the tubular member and also includes a visual display unit for displaying the scanning signals obtained from the electro-optical scanning means.

Conveniently the inspection apparatus located externally of the tubular member comprises a longitudinal sequence of the drying means, the corrosion preventing applying means, the cleaning means, the electro-optical scanning means and an ultra-sonic receptor means.

Preferably the external inspection means is divided into zones separated by sealing members comprising perforated flexible diaphragms.

Conveniently the cleaning means comprises means for blasting the wall of the tubular member with abrasive particles.

Preferably the support means comprises a track along which the inspection means is drivable, support members for supporting the tubular member and for the accurate location thereof, clamp means for securely holding the tubular member on said support member, and means for withdrawing said support members and said clamp means into the bed to permit passage of said inspection means along said tubular member.

Conveniently the support members and the clamp means are hydraulically operable.

According to another feature of said further aspect there is provided apparatus for inspecting and treating elongate tubular members such as production pipe sections used for oil or gas wells comprising an elongate bed, an external processing member for processing the external surface of the tubular member and a probe member for providing internal surface processing of the tubular member, said external processing member having a processing tunnel for receiving a tubular member, a bed for supporting said tubular member and a driving means for driving the said processing member forwards and backwards along the bed, and said external processing member providing in circumferential zones along the tunnel hot air means for supplying drying air under pressure, inhibitor application means for spraying a corrosion prevention coating on the tubular member, abrasive particle blasting means, air cleaning means for removing dust and abrasive particles from the external surface of the tubular member, electro-optical video scanning means for profile scanning of the said external surface and providing remote visual inspection thereof, and, in a final zone, ultrasonic receptor means, said zones providing 360° processing, testing and inspection around the tubular member, and said processing zones being separated from one another and from said testing and inspection zones by means of sealing members comprising perforated flexible diaphragms, wherein said probe member is supported centrally within the tubular member by a plurality of retractable arms and a telescopic slidable support means including drive means for expanding and retracting the telescopic slidable support is provided for moving the probe within said tubular member so that the probe maintains a fixed spatial relationship with the said external processing member, said probe member defining treatment zones along the length thereof comprising in succession abrasive particle blasting means, inhibitor applicator means for spraying a corrosion prevention coating on the tubular member, compressed air cleaning means, optical/video scanning means for profile scanning of said internal surface and providing remote visual inspection thereof and, in a final zone, ultrasonic transmitting means, said probe member being located relative to the external processing member such that the optical/video scanning means and the ultrasonic means of each member are maintained in registration and said treatment zone providing 360° processing, testing and inspection of the interior surface of the tubular member, said probe member being connected to remote services and supplies by means of an umbilical cable passing through said telescopic slidable support, and said tubular member is supportable by a plurality of retractable supports which are selectively retractable into the bed to permit the passage of the external processing member along the bed whilst the tubular member is in position on the bed.

BRIEF DESCRIPTION OF THE DRAWINGS

The invention will now be described by way of example with reference to the accompanying drawings in which.

In the Figures, like reference numerals denote like parts.

DESCRIPTION OF THE PREFERRED EMBODIMENTS

Figure 1:
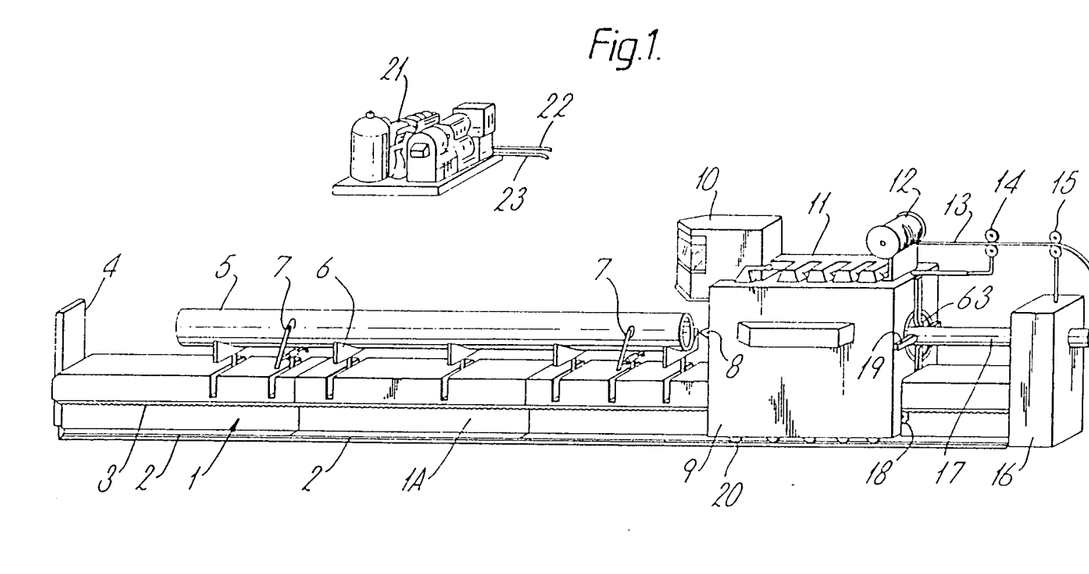
FIG. 1 illustrates a perspective view of an apparatus for performing the method in accordance with the invention.

Referring now to FIG. 1, there is shown a sectionalised base assembly 1 having a bed 1A supporting a rail track 2 on opposing longitudinal sides thereof. A continuous, geared rack 3 extends parallel to each rail track 2 along a line approximately half-way up the base assembly 1. A demountable stop assembly 4 is secured vertically at one end of the base assembly 1. Because the base assembly is constructed in sections for portability, so the stop assembly 4 is arranged so that it can be moutned to the end of other base assembly sections in dependence upon the length of base assembly required. A tubular case section 5 which could be approximately 42 feet (12.6 meters) long and 36 inches (0.91 meters) in diameter is illustrated positioned on the bed 1A supported by adjustable and retractable vee supports 6 and held by adjustable and retractable clamps 7 both of which are retractable into slots in the bed 1A. A probe unit 8 is illustrated about to enter the case section 5 and is arranged to advance along the case section 5 in synchronisation with the movement of an external processing unit 9 for processing the external surface of the case section, the operator having an overall view from the control cabin 10. On the roof of the processing unit is a ducting 11, for dust extraction, and a dispensing and a gathering spool 12 for a probe umbilical cable 13 for providing control to the probe and for transmitting the results of scanning operations to the described hereinafter to the control cabin 10. A telescopic support 14 supports the umbilical cable between the spool and the fixed support 15 mounted on an expander housing 16 situated at a second end of the base assembly 1. A probe expanding and retracting sliding tube assembly 17 is attached to the probe 8. The umbilical cable 13 is carried through the tube assembly 17 to the probe.

Drive gears 18 mesh with the geared rack 3 for drivably moving the external processing unit 9 which is supported by free running wheels 20 running on the track 2. Triple or quadruple adjustable roller bearing centralisers 19 fitted to the front and rear of a processing tunnel in the processing unit 9 ensure that the case section 5 is held in a central position within a processing tunnel 63 of the unit 9. A power skid 21 contaions diesel generators, compressors, fuel tanks, controls, etc., to supply the main assembly with electrical power, via cables 22, and high pressure compressed air by way of armoured tubes 23. The skid enables the apparatus to be set up and operated in remote situations. A set of different diameter probes can be provided, which can be substituted one for another, to enable tubular members having a wide range of diameters to be processed.

Figure 2:
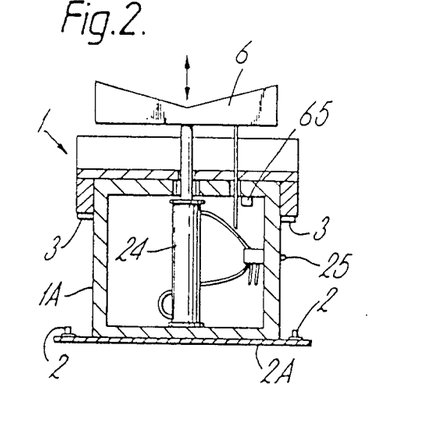
FIGS. 2 and 2A illustrate, in cross-section, apparatus for raising, retracting and operating tubular member supports and retaining clamps to enable a wide variety of tubular members of different diameters to be supported or gripped.
Figure 2A:
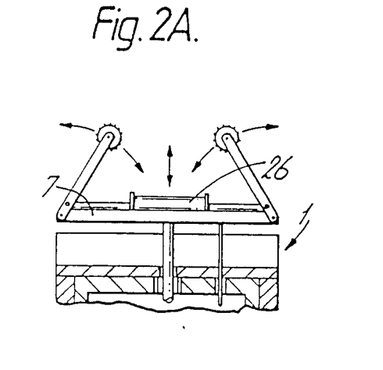
Figure 3:
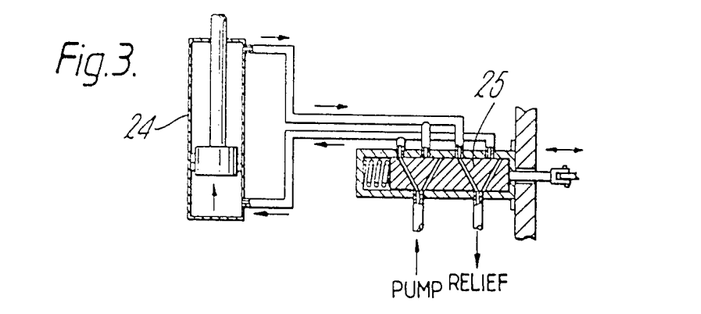
FIG. 3 illustrates, in cross-section, the hydraulic circuitry and depressable valve system required to retract the clamps and supports immediately prior to the advance of the processing unit, and to allow them to return to position once the processing unit has passed.

Referring now to FIGS. 2, 2A and 3, there is illustrated a cross-section through the base assembly 1 in which the bed 1A comprises a welded hollow section of heavy gauge and size with a base plate 2A along which run the guide rails 2, and welded drive racks 3. A vee support 6, which is one of a plurality, is made to rise and fall by a respective lifting means comprising hydraulic unit 24. Hydraulic pressure applied to either end of the hydraulic unit provides the means to move the vee support up or down. In its bottom-most position support 6 is retracted into a slot in the bed. A control valve for each support is mounted within the bed 1A such that its actuator protrudes through the side members of the bed. The latter is also provided with a plurality of clamps 7 for clamping the tubular member on the bed which are similar in their general structure to the support 6 and which are illustrated only insofar as they differ therefrom in FIG. 2A. As shown in the FIG. 2A, the clamps 7 each also comprise, in addition to the lifting unit shown specifically in FIG. 2, a double-acting hydraulic unit 26 controlling the jaws of the clamp so that they grip the sides of the tube 5. This hydraulic unit is also used to collapse the jaws prior to the retraction of the clamp 7 into its respective slot in bed 1A.

FIG. 3 illustrates the circuitry between the valve 25 and the hydraulic unit 24. Control of hydraulic ram unit 24 is obtained by movement of an actuator spindle in valve 25 and by the supply of fluid pressure to the valve. With the valve as shown being kept extended by a coil spring, pressure is admitted to the base of the piston which is urged upwards in the cylinder. Depression of the valve pressurises the upper half of the cylinder and allows the lower half to exhaust, causing a downward pressure on the piston so as to retract the support. A similar arrangement is used to control the hydraulic unit 26 of clamp 7. Position control of both arrangements is provided by a position sensor 65 which feeds back signals to a controller in control cabin 10, which in turn controls a master setting valve 64 (see FIG. 9).

Figure 4:
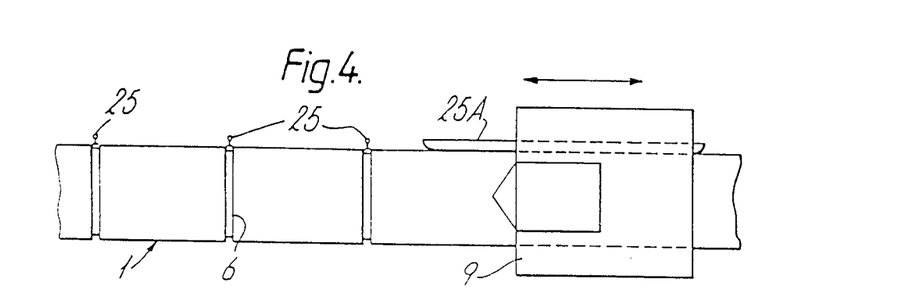
FIG. 4 illustrates a plan view of the valve operating cam which is attached to the processing unit and controls automatically the raising and lowering procedure of supports and clamps.

FIG. 4 illustrates in plan view, a valve operating cam 25A which is attached to the external processing unit 9 and is arranged to depress the valves 25 of each support or clamp, in turn, as the processing unit moves along over the base assembly sections 1.

Figures 5, 6:
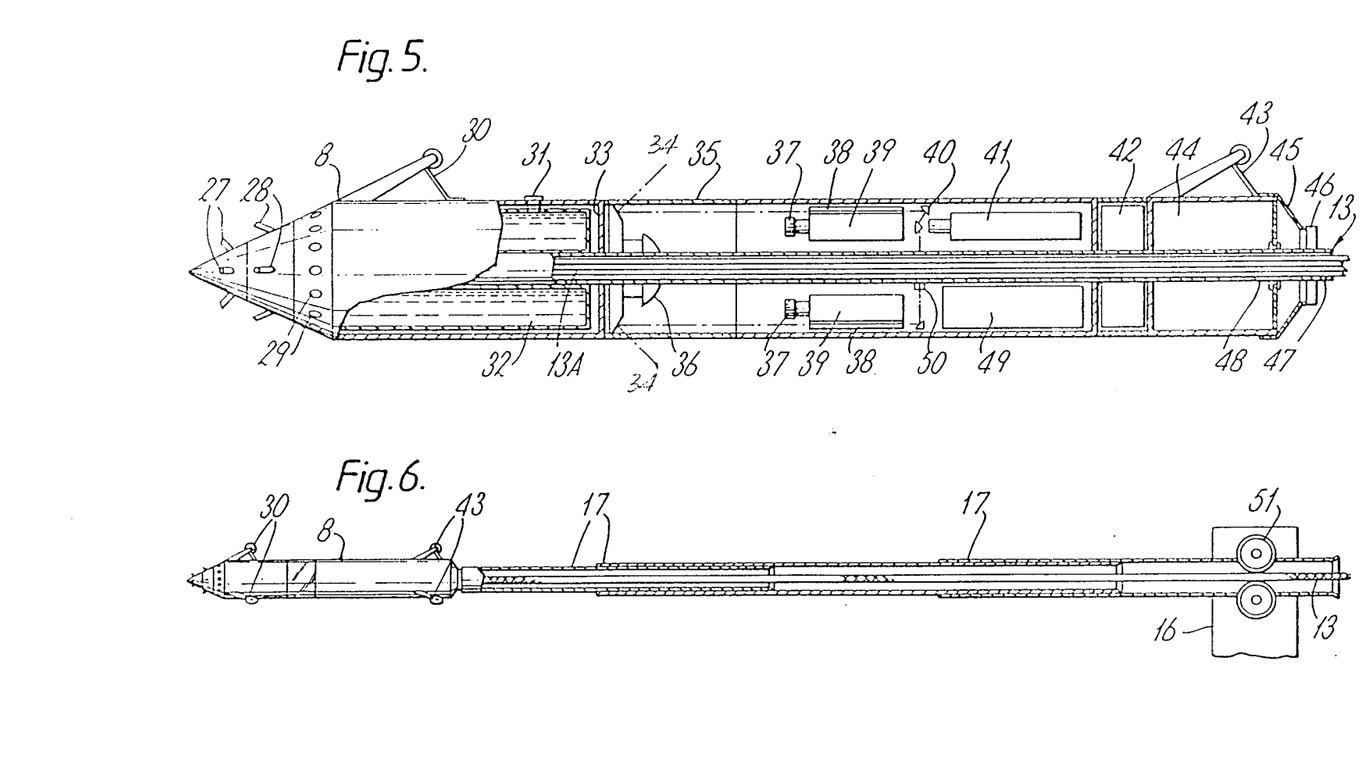
FIG. 5 illustrates in partial longitudinal cross-section a multi-operation probe which is located in the tubular member in a central position by triple or quadruple roller centralising units; this probe, which may be used down-hole, is fed with the various means required for its functions and is controlled in operation by an umbilical supply cable.
FIG. 6 illustrates in partial longitudinal cross-section an expanding and retracting sliding tube assembly which is attached to the probe and controls the advance and retraction of the probe in the tubular member being serviced in synchronisation with the movement of the processing unit.

In partial cross-section the probe 8 is shown in FIG. 5. Starting at the leading end on the left of the FIG. 5, is a nose cone, the first section of which carries shot, sand and/or vapour blasting nozzles 27 set in circular pattern facing forward. These are fed from an extension 13A of the umbilical cable 13, carried through the probe. The next nose cone section carries inhibitor liquid dispensing spray nozzles 28. These are also set in circular pattern facing forward and are fed from pressurised tank 32 which may be refilled from the umbilical cable 13. The next nose cone section has a circular array of air jetting holes or openings 29 supplied with compressed air provided by the umbilical cable. The nose cone capability as illustrated is shot, sand and/or vapour blasting to remove scale, rust, etc., corrosion inhibition by means of an inhibitor which coats the interior surface of the tubular member and forced air drying. The sections may be selectively operated or operated in different sequences, or more usually operated in sequence.

The inhibitor used will depend upon the specific compound of the pipe material and upon the acidity of the pipe location. Thus the inhibitor used may vary along the length of the pipe, for example in a marine riser or platform leg where splash zone and anti-marine fouling coatings are required. Thus, those ordinarily skilled in the art will appreciate that inhibitor coatings for differing pipes and differing situations may be derived from the relevant American Petroleum Institute Standard (A.P.I.)—or similar standards such as those derived by the British Standards Institute or the European D.I.N. Standards Organisation. For completeness, however, the following examples are given:

EXAMPLE 1

A drill pipe is a hot-rolled, pierced, seamless tube, with various chemical compositions, e.g. A.P.I. Grade D has a minimum yield strength of 55,000 p.s.i. whereas A.P.I. Grade E is a similar tube but having a minimum yield strength of 75,000 p.s.i. Such tubes are generally used in length of 31 feet including tool joints. To protect such tubulars from corrosion and abrasion, the coating used may be that sold under the 3M Company Trade Mark "Skotchkote".

EXAMPLE 2

For marine risers, various A.P.I. grades may be used as far as chemical composition and yield stress are concerned. In this example the coating is required to provide some flexibility in addition to corrosion resistance so Webco Company "Linecote IC" grade composition is used. If in addition hot hydrocarbons were involved, the Webco Company "Linecote IPC" grade coating composition would be used, these coatings being polychloroprene based to provide a temperature range protection from −20° C. to 120° C. and comprise a flexible elastomeric layer with an outer layer of closed cell PVC foam.

EXAMPLE 3

For offshore platform tubular legs various composition A.P.I. material grades may be used, the coating however requiring to be resistant to salt water corrosion and general weathering; in some regions antimarine fouling coatings are also required. Webco Company "Zonecote" polychloroprene coating may be used above and below the centre of the splash zone to protect against salt water corrosion. At depths below the splash zone the problem of marine growth is evident and so an anti-fouling coating is required. Thus a coating of a cupronickel composite coating allowing the slow release of copper compounds generally poisonous to marine life is used and such a coating is "SeaMark Baria".

EXAMPLE 4

Offshore platform tubulars in general used, for example as deck supports, helicopter pads, ramps, cranes, etc. require coating resistant to corrosion, abrasion, salt-spray and chemicals. Such a coating is the Jotun-Henry Clark Company "Baltoflake" range of coatings which is a glass-flake polyester coating applied by airless spray, the coating thickness varying from 600 microns to 1500 microns.

EXAMPLE 5

For flowlines laid for example by a reel barge and where a low level thermal insulation is required Webco Company "Linecote IC" grade is used. Where greater thermal insulation is required plus greater resistance to abrasion and tear, Webco Company "Linecote IPC" grade is used. The tough polyurethane coating of "Linecote IPC" provides a protective sheath and also penetrates radial and longitudinal joints to form a sealed compartment to assist joints withstanding stresses created during pipelaying operations.

EXAMPLE 6

Land line tubulars for carrying gas may be protected by polyurethane, bonded epoxy, or zinc based paint. Where abrasive chemicals are carried Jotun-Henry Clark Company "Baltoflake" is used internally with a concrete based external coating from Blue Circle Cement Company.

Front adjustable roller centraliser 30 of probe 8 may be of the triple or quadruple arm type, and may be of the manual or hydraulic pressurised type; they maintain the probe in a central position in the tubular member. A filler plug 31 allows the manual filling of inhibitor liquid tanks 32. A bulkhead 33 separates the nose cone and inhibitor tanks from a following inspection unit provided in the probe. An inspection unit has an armoured glass or acrylic 360-degree port section 35 in the probe body allowing a reflective surface 34 to provide a circumferential band of light generated by a laser 41 via prisms 40 and 50 and telescopic mounts 38 to illuminate a complete circumferential portion of the tubular member. Viewed information of the pipe wall in a live scan format is provided by four equicircumferentially spaced video cameras 39 via a further reflective surface 36. Focus of each camera is remotely controlled when required, by auto-focus units 37. Although electro-optical video cameras are used in the preferred embodiment it will be realised by those skilled in the art that other optical viewing means may be employed such as photographic film cameras.

A method by the present inventor of mensuration in three dimensions using line scanning is the subject of a European Patent Application No. 84300028.2 which was published by the European Patent Office on the 18th July 1984 under Publication No. 0113691A and also the subject of a corresponding U.S. Pat. No. 4,613,123 (application Ser. No. 568,381 filed on the 5th Jan. 1984), and a similar method may be used in the present apparatus, the specification of said prior applications being incorporated herein by reference. Controllers and signal boosting equipment therefor are housed in a distribution box 49.

A group of ultrasonic signal generators (for use with ultrasonic receptors described later herein) are located in circular fashion in a double bulkheaded section 42; the bulkheads are lined with sound insulation and the signals are radiated outwards from the probe. The last section of the probe 44 provides space for additional equipment, for example: power pack, video recorder, signal amplifiers, mixers, modulator and transmitter, etc. Mounted on the outer diameter of this section of the probe case are retractable rear centraliser units 43 which may be similar to the front centralisers 30. A removable end cap 45 and a locking connector 46 connect the probe to a sliding tube assembly 17. The umbilical cable 13 has an armoured sheath 47 and is grommeted to a probe core skeleton tube 48.

Referring now to FIG. 6, there is illustrated the probe 8 attached to the telescopic sliding tube assembly 17 which is in turn mounted in the exapnder housing 16. Reversible rubber drive rollers 51 in the expander housing 16 act on the armoured sheath 47 of the umbilical cable 13 and are capable of speed adjustment, being synchronised with the drive motor/gearboxes for the processing unit. These drive rollers 51 as illustrated are one of the means for controlling the advance and retraction of the telescopic tube assembly. Air pressure bleed into the tubes causes the tubes to extend, and the drive rollers are used to control the speed of extension by drag on the armoured umbilical cable sheath. On the retraction stroke the air bleed is stopped and the drive rollers operate in reverse to pull the probe and sliding sections back.

Figure 7:
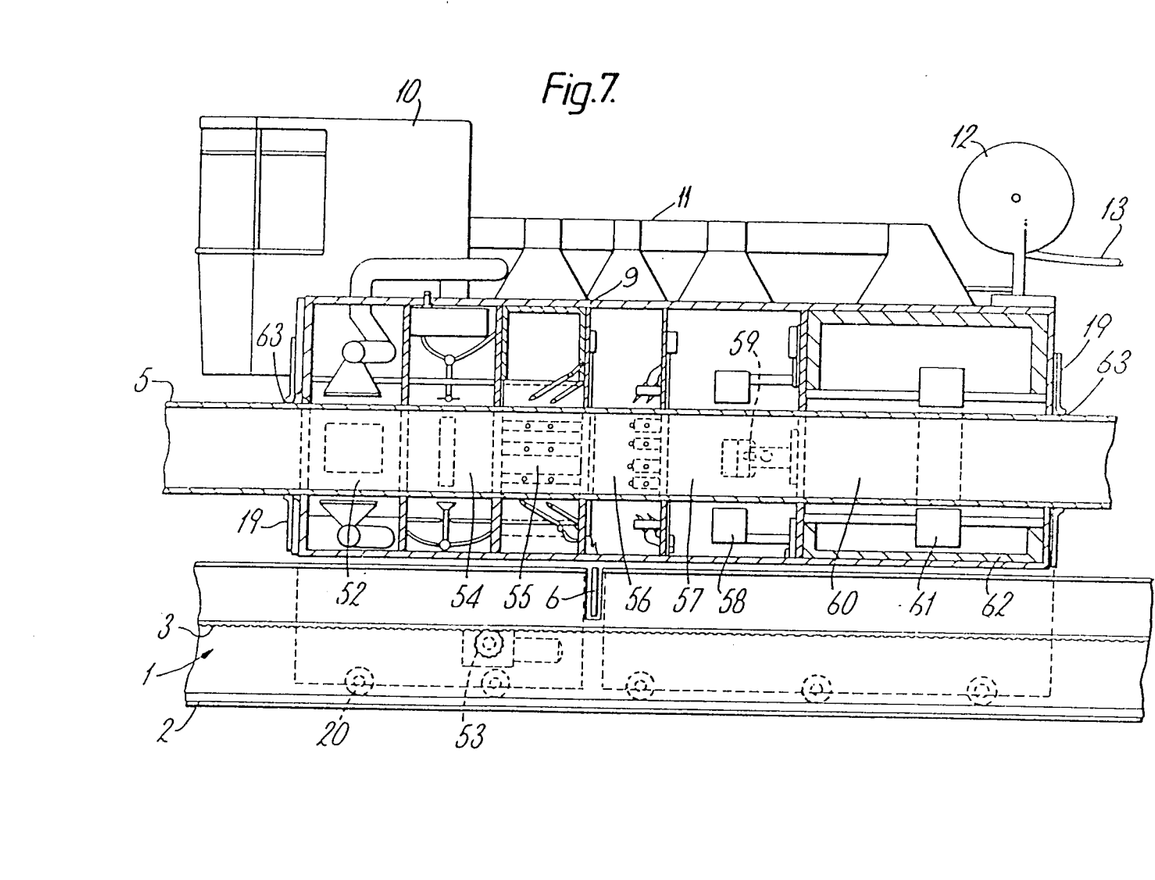
FIG. 7 illustrates a cut-away section of a processing unit of processing the external surface of the tubular members, and which traverses over and around the tubular members to be serviced and inspected.

Referring now to FIG. 7, this illustrates the external processing unit 9 positioned part of the way along the base assembly over a portion of the tubular member 5. The probe 8 which would normally be simultaneously passing through the tubular member 5 is excluded from the figure to aid clarity.

The processing unit has in effect six separated chambers surrounding a processing tunnel 63. The first, 52, is hereafter referred to as The Inhibitor Drying Chamber and contains hot air ducts arranged in circular fashion to play pressurised hot air over the 360 degrees of the tubular member external surface. The next chamber, 54, hereafter known as The Inhibitor Application Chamber, contains spray jets arranged in circular pattern enabling pressurised inhibitor liquid, examples of which are hereinbefore described, to be sprayed on the entire circumference of a tubular member so as to provide a coating thereon. Inhibitor holding tanks are located above the spray jet ring.

On the bulkhead between this chamber and the next is a perforated diaphragm comprising an iris-type shutter with flexible tips which can be adjusted from the control cabin to partially seal around the tubular member. The next chamber 55, hereafter known as the Blast Chamber, contains blasting nozzles in a circular pattern facing forward at an angle in a double row. Through these nozzles can be passed shot, sand and/or vapour under pressure to clean the tubular member outer diameter. The chamber is lined with rubber/fabric bonded sheeting to prevent damage to the chamber walls, a grid section floor allows the shot or sand to be continuously recycled and fed back to the nozzles. The next chamber 56 hereafter known as the Air Cleaning Chamber contains air jet nozzles in a circular pattern. These blow off any shot, sand, scale or dust left by the preceding blasting. Iris-type circular shutters are fitted at the entry and exit to this chamber. The next chamber, 57, is known as the External Surface Scanning Chamber. The latter chamber contains laser projection and video units 58 including four cameras 59 which are adjusted by remotely controlled mechanisms, the cameras being mounted on radial sliders that allow them to advance or retract to suit the size of the tubular member 5. These units provide a full scanning of the entire outer circumference of the tubular member using a process similar to that used by the probe and disclosed in the Applications previously mentioned. The next chamber 60 hereafter known as the Sonic Chamber contains ultrasonic receptors 61 placed in circular pattern, these pick up the sound patterns from the ultrasonic signal generators in the probe bulkhead section 42, after the sound has passed through the walls of the tubular member; variations from norm in the signal pattern denote wall defects. In this respect the ultrasonic devices are used to detect impurities in the tubular member wall and to initialise the ultrasonic devices a known pure sample of the tubular member is used for comparison purposes. Chamber 60 is heavily sound insulated to ensure the receptors only pick up signals from the probe signal generators. Insulation 62 is provided all round the inner walls of the chamber. All sections or chambers are subjected to high vacuum dust extraction and particularly the chambers 53, 55 and 56, by means of the overhead ducting 11 which is linked with high vacuum extractor fans.

Figures 8, 11:
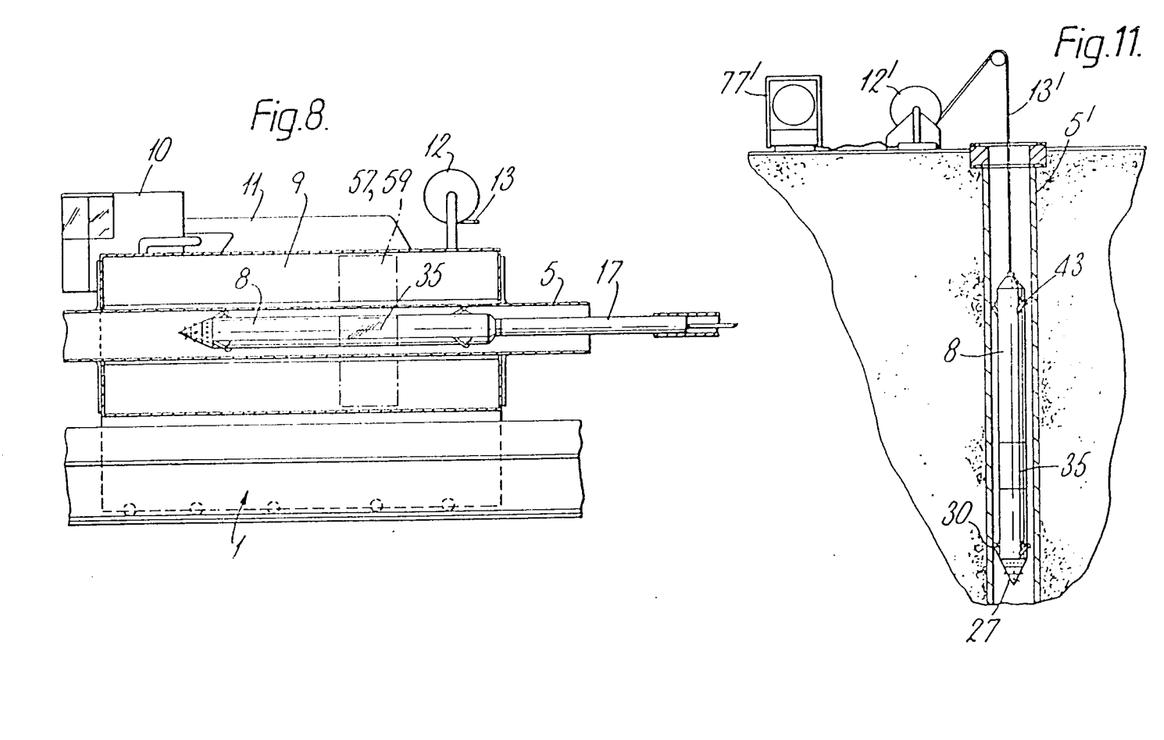
FIG. 8 illustrates in partial cross-section the relative positions of probe and the processing unit during operation; this relativity is maintained through advance and retraction along the tubular members.
FIG. 11 illustrates in partial cross-section the use of the probe alone in the vertical position for the remote treatment and inspection of the pipe walls in a well or to carry out an examination of protective case section condition.

FIG. 8 illustrates the position of the probe 8 in the tubular member 5 during the processing of the latter, and the tied relationship between section 35 of the probe and chamber 57 of the processing unit and section 42 of the probe and receptors 61 of the processing unit. The sections of the probe and processing unit for internal wall scanning and external wall scanning require alignment to check for ovality and wall thinning. Similarly the ultrasonic units in the probe and processing unit are in alignment. This is why synchronisation of probe and processing unit traverse is required.

The operation of the apparatus will now be described.

The diameter of tubulr members to be serviced is ascertained, the appropriately sized probe is fitted (if not fitted already), and the power skid equipment is switched on to provide the electrical and pneumatic power supplies to the control cabin 10, the external processing unit 9 and the probe 8. The external processing unit and probe are retracted, the hydraulics for the supports 6 and clamps 7 are switched on, the support and clamp heights are set remotely from the control cabin to suit the tubular member, the clamp grips are likewise set to suit tubular member diameter. The centralising roller units 19, the iris shutters, the laser/video units 58 and sonic receptors 61 are set. The drive speed for movement set and synchronisation between probe 8 and operating unit 9 are checked. Shot/sand/vapour supplies and inhibitor supplies are checked on both probe and external processing unit, the probe centraliser units set, all other equipment checked for operation and setting to suit tubular member diameter. The first tubular member of a given size is lifted by yard crane or forklift and placed in the raised pipe supports and the clamps 7 are operated to secure the tubular member. Probe and processing unit scanning alignment is checked and both are set in motion to perform a forward traverse along the tubular member. The shot/sand/vapour blasting sections 55 and 56, and 27 and 29, are now activated, as are sections/devices 57 and 60, and 35 to 42, and also dust extraction. As the assembly moves along the tubular member, the internal and external walls of the tubular member are blasted, air cleaned, the profiles secured over the entire intended external circumferences to detect, inter alia, inclusions, reeding, and the tubular member is ultrasonically checked. It will be appreciated information concerning immediately opposing sides of the tubular member wall must be simultaneously viewed or stored for comparison purposes. When sections 42 and 61 have passed the pipe end the reverse motion control is operated to reverse the direction of movement of the external processing unit and the probe. It should be explained that the supports are retracting into respective slots in the base section, as are the clamps, to allow passage of the processing unit, the supports and the clamping being restored after passage of the assembly as controlled by the valves 25 and the cam 25A.

On the retraction stroke, the blasing, air cleaning, and both surface and sonic scanning sections are switched off automatically, the inhibitor spray sections 28 in the probe and 54 in the processing unit are switched on, as is the drying chamber 52. The assembly retracts along the tubular member coating the inner wall, and coating and drying the outer wall surface thereof with inhibitor. The tubular member is removed and replaced by another, the cycle repeating. Should a tubular member be found to have a defect, damge, or br out of tolerance, a visual/audible warning is given to the operator in the cabin 10 who can override the auto cycle to manual control and re-check any suspect area or operation, or he can, alternatively, fast retract the external processing unit and probe, have the suspect tubular member removed and replaced by other for another cycle. The operation cycle: blasting, cleaning, surface defect scanning and sonic scanning on the advance stroke, and inhibitor coating and drying on the reverse or retraction stroke are not obligatory in that the sequence can be changed and the activation on advance or retract strokes of any operation can be changed to suit requirements. The sequence illustrated is considered the most likely, but for example cleaning could take place on the advance stroke and either or both visual surface and sonic scanning could take place on the retraction stroke.

It is considered that the equipment can accommodate all diameters of tubular member from 3 inches or smaller inner diameter, up to 36 inches diameter, using possibly three probe units. Lengths from 30 feet to 45 feet can be accommodated as standard; a change in base section assembly will accommodate shorter lengths if required, the centre base section being removed.

Figure 9:
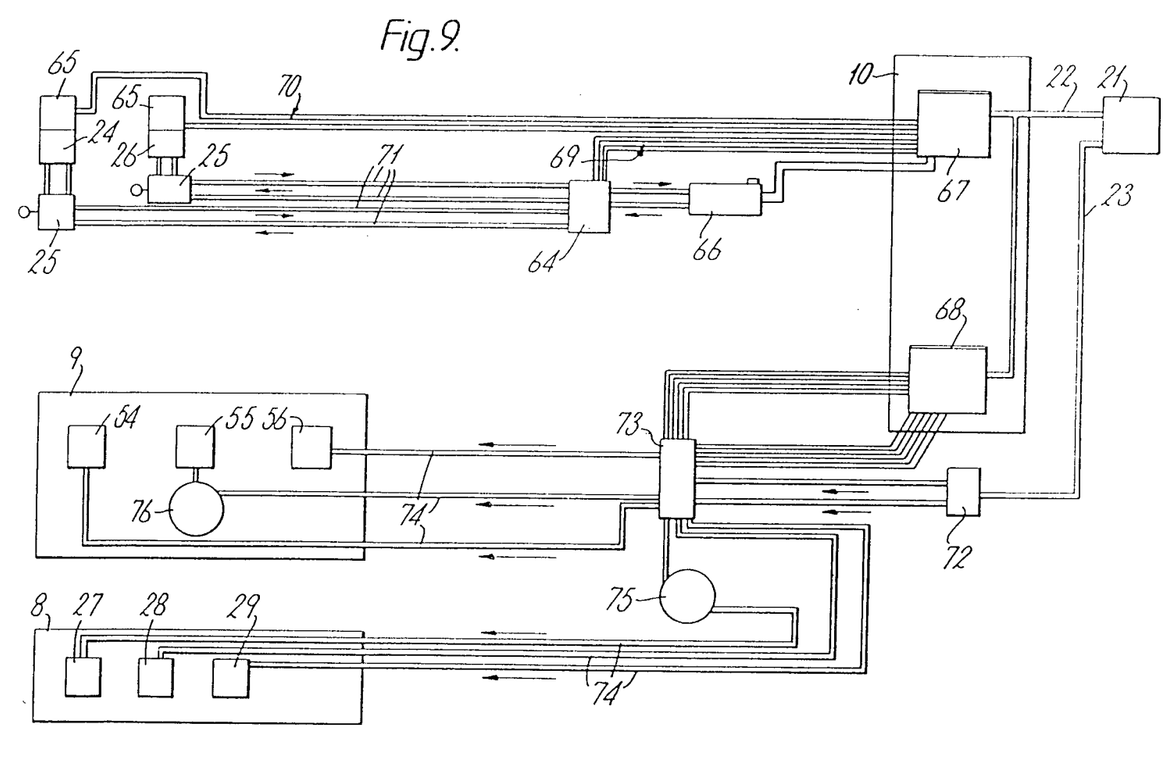
FIG. 9 illustrates in schematic form the operating circuits for the various operations carried out by both probe and processing unit of FIGS. 1 to 7.
Figure 10:
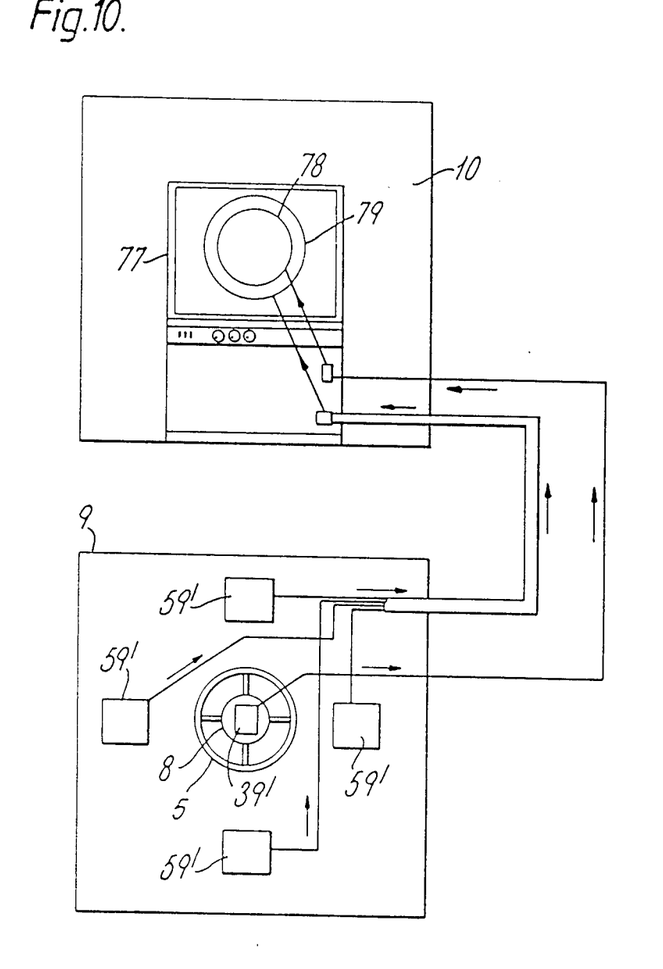
FIG. 10 illustrates the operator display unit for displaying the remnote scanned profiles of the tubular member.

Referring particularly to FIGS. 9 and 10, control of the equipment is exercised from cabin 10 by mens, inter alia, of hydraulic controller 67 and pneumatic controller 68, both of which are electrical/electronic units of conventional design. Electrical power for these controllers and the other electrical equipment is provided by the skid 21 via cable 22. The skid also provides a pressurised air supply to the equipment via an air hose 23. Hydraulic power is provided by a pump and tank unit 66 serving the hydraulic master setting valve unit 64, both of which are conveniently mounted on the bed 1A.

The valves of unit 64 are controlled from the controller 67 via control lines 69 and are operated so as to set the normal operating heights of the supports 6 and the clamps 7 by controlling the fluid supply in the hydraulic lines 71. Electrical feed-back signal is provided by the retrospective position sensors 65 during the setting up procedure along signal lines 70 to the controller 67 to enable the height of the supports and clamps to be set precisely. Once set, the valves of the master unit are not usually disturbed unless the size of tubing changes. The valves 25 enable operation of the hydraulic units so that the supports and/or clamps are retracted to their bottom-most positions during the traverse of the external processing unit 9.

A primary pneumatic supply is provided from the skid 21 to a manifold unit 72 contained on the external processing unit 9 via air hose 23. Manifold unit 72 supplies air to control valves in the control unit 73 which then distributes it under the control of the pneumatic controller 68 via pneumatic lines 74 to the various processing chambers 54, 55 and 56 of the external processing unit 9 and the processing sections 27, 28, 29 of the probe 8. Reservoirs 75, 76 containing supplies of shot or sand are incorporated in the pneumatic lines to the chamber 55 of the external processing unit 9, and the section 27 of the probe 8. These reservoirs are suitably mounted on the processing unit 9.

Cabin 10, in addition to the controllers 67 and 68 already referred to, will house various indicators, manual controls and also the controls for the inspection devices contained in the probe 8 and the external processing unit 9. In particular there is provided therein a visual display unit (VDU) 77 connected to video transmitters 39', 59' respectively situated in the probe 8 and the external processing unit 9 which are coupled to the aforesaid video cameras 39 and 59. The VDU displays simultaneously two traces 78, 79 representing the 360° optical/video scans of the internal and external surfaces of the tubular member in a plane perpendicular to the axis thereof.

The probe 8 of this invention is particularly suitable for use, by itself, down-hole in an oil or gas well, or any other similar pipe lines which of course need not be vertical. A typical application is illustrated in FIG. 1 which shows the vertical pipe 5' of a well.

Probe 8 is suspended on a standard wire line 13' which will incorporate an umbilical cable 13 (not shown). The wire line is payed out from a drum 12' which stores the unused wire line and provides a termination for the umbilical cable. The video signal is coupled via the umbilical cable to a VDU 77' which is illustrated showing a trace corresponding to a scan of the internal wall of the pipe 5'. The apparatus is preferably entirely portable, so that it may be set up in the field wherever required, and may include its own power supplies and other services. The facilities of the probe may be limited to air and/or abrasive particle blasting and the optical/video scanning equipment or may also include the inhibitor spraying and air drying facilities.

In a typical operation, the probe may be lowered to a position where damage is suspected or alternatively the length of the pipe may be inspected from the surface downwards until a faulty or damaged section is located, the inspected section of the pipe is cleaned and is then scanned with the optical/video equipment. If a pipe section needs to be replaced, then the pipe string would be withdrawn from the well to the surface, the probe unit would be reassembled into the main assembly shown in FIG. 1, a new pipe section would be checked and treated, the faulty section would be removed from the pipe string, the new section would be inserted therein in place of the faulty one, and the string would be returned down-hole.

Although particular embodiments of the invention have been described and illustrated herein, modifications and variations may readily occur to those skilled in the art. Thus the pipe lines referred to generally herein are not limited to the pipes or pipe sections of oil and gas installations but may also include thermal and water installations, pipe lines in chemical plants and supply lines for other plants and installations. Consequently it is intended that the claims herein be interpreted to cover such modifications, variations and applications.

I claim:

1. A method of inspecting at least one of an inner circumferential surface and an outer circumferential surface of an elongate tubular member including the steps of:
   (a) moving an apparatus along said tubular member, and during movement therealong said inspection apparatus in a single operation sequentially
   (b) cleaning said at least one of the inner circumferential surface and the outer circumferential surface of the elongate tubular member
   (c) optically scanning simultaneously the entire 360° circumference of at least one of the inner circumferential surface and the outer circumferential surface of the elongate tubular member that was cleaned during step (b) and
   (d) effecting comparison checks where at least one of ovality and wall thickness deviation are to be determined.

2. A method according to claim 1, wherein the steps (a)–(c) are performed in a single forward pass along said tubular member.

3. A method according to claim 2, wherein the step (c) is an electro-optical scanning process.

4. A method according to claim 3, wherein the tubular member is secured upon support means and said inspection apparatus simultaneously cleans both the inner and outer circumferential surfaces of said tubular member as said inspection apparatus moves therealong and the step of electro-optically scanning is performed simultaneously on opposed sides of the tubular member wall.

5. A method according to claim 4, wherein in a return pass of the inspection apparatus it applies a corrosion preventing material and dries said material on at least one of the inner circumferential surface and the outer circumferential surface of said elongate tubular member.

6. A method according to claim 5, wherein the inspection apparatus includes means for ultra-sonically testing the tubular member and said ultra-sonic testing is effected concurrently with at least one of steps (b) and (c).

7. In a method of inspecting and treating an elongate tubular member such as production pipe sections used for oil or gas wells, the improvement comprising the progressive zonal inspectional and treatment along the length of at lest one of an internal surface and an external surface of the tubular member such that the entire inspection and treatment is carried out in one cycle of operation by an inspection and treating apparatus, said cycle including a forward pass and a return pass along said member by motion of said inspection and treating apparatus therealong, said cycle during said forward pass of said inspection and treating apparatus comprising cleaning the member over at least one of the inner circumferential surface and the outside circumferential surface and inspecting the member simultaneously over the entire 360° circumference of at least one of the inner circumferential surface and the outer circumferential surface by viewing the member with an inspection device capable in a single view of viewing 360° for effecting comparison checks where at least one of ovality and wall thickness deviation are to be determined, said cycle during said return pass of said inspection and treating apparatus comprising coating the member with a corrosion preventive material and drying the coated member.

8. A method according to claim 7, wherein said treatment is carried out simultaneously on the internal and external wall circumferential surfaces of the member within the same zone.

9. A method according to claim 8, wherein the step of cleaning the tubular member comprises blasting with abrasive particles followed by the removal of dust and loose particles by forced air jets.

10. A method according to claim 9, wherein the step of drying includes heating air before it impinges on the tubular member.

11. A method according to claim 10, wherein the step of inspecting the tubular member includes at least one of the processes of circumferential video profile inspection, circumferential video profile measurement and circumferential ultra-sonic scanning.

12. An apparatus for inspecting at least one of an inner circumferential surface and an outer circumferential surface of an elongate tubular member including an inspection apparatus arranged to be movable along said tubular member and comprising cleaning means for cleaning at least one of the inner and outer circumferential surface of said tubular member and an optical scanning means for simultaneously viewing the entire 360° circumference of said at least one of the inner and outer circumferential surface immediately following cleaning by said cleaning means, and means for effecting comparison checks for determining at least one of ovality and wall thickness deviation, whereby said apparatus is adapted to effect the method of said claim 1.

13. An apparatus according to claim 12, wherein the optical scanning means is an electro-optical scanning means.

14. An apparatus according to claim 13, wherein the cleaning means and the electro-optical scanning means are each arranged to be operative during a single forward pass of the inspection apparatus along said tubular member.

15. An apparatus according to claim 14, wherein the tubular member is secured upon a support means and said inspection apparatus comprises separate cleaning means respectively on the inside and the outside of said tubular member to simultaneously clean the inner and outer circumferential surfaces of said tubular member as the inspection apparatus moves therealong and separate electro-optical scanning means are provided on each of the inside and the outside of said tubulr member whereby the inside entire circumferential surface and the outside entire circumferential surface of the tubular member are viewable.

16. An apparatus according to claim 15, wherein the inspection apparatus further comprises means for applying a corrosion preventative material and a drying means whereby on a return pass of the inspection apparatus the corrosion preventing means and the drying means are operative.

17. An apparatus according to claim 16, wherein a corrosion preventing applying means and a drying means are locatable respectively on the inside and the outside of said tubular member.

18. An apparatus according to claim 17, wherein the inspection means further comprises an ultra-sonic testing means for detecting flaws in the wall of the tubular member.

19. An apparatus according to claim 18, wherein the inspection apparatus comprises a probe for insertion into the tubular member, said probe having guidance means for centering the probe in the tubular member and said probe having in discrete compartments therealong the cleaning means for the interior surface of said tubular member, the means for applying a corrosion preventing material to the inner surface of said tubular member, air drying means, and said electro-optical scanning means.

20. An apparatus according to claim 19, wherein an ultra-sonic testing means has an ultra-sonic generator located in the probe.

21. An apparatus according to claim 20, wherein the electro-optical scanning means located in the probe comprises a light means and an associated reflective means arranged to illuminate a circumferential strip of the inside circumferential wall of said tubular member, and a plurality of viewing means arranged to view the entire circumference of the circumferential strip of wall illuminated by said light means.

22. An apparatus according to claim 21, wherein the light means is a laser and the viewing means are video cameras.

23. An apparatus according to claim 19, wherein said probe has a plurality of extendable arms for support centrally within tubular members of varying internal diameters and an expandable and retractable telescopic tubular member at one end of said probe for communicating with a service unit external of said tubular member, wherein said probe is connected to said service unit through an umbilical cable which passes through said telescopic tubular member.

24. An apparatus according to claim 23, wherein the service unit includes a drum for storing sections of the umbilical cable not transferred to the tubular member and also includes a visual display unit for displaying the scanning signals obtained from the electrooptical scanning means.

25. An apparatus according to claim 24, wherein the inspection apparatus located externally of the tubular member comprises a longitudinal sequence of the drying means, the corrosion preventing applying means, the cleaning means, the electro-optical scanning means and an ultra-sonic receptor means.

26. An apparatus according to claim 25, wherein the external inspection means is divided into zones separated by sealing members comprising perforated flexible diaphragms.

27. An apparatus according to claim 12, wherein the cleaning means comprises means for blasting the wall of the tubular member with abrasive particles.

28. An apparatus according to claim 15, wherein the support means comprises a track along which the inspection means is drivable, support members for supporting the tubular member and for the accurate location thereof, clamp means for securely holding the tubular member on said support member, and means for withdrawing said support members and said clamp means into the bed to permit passage of said inspection means along said tubular member.

29. An apparatus according to claim 16, wherein the support members and the clamp means are hydraulically operable.

30. Apparatus for inspecting and treating elongate tubular members such as production pipe sections used for oil or gas wells comprising an elongate bed, an external processing member for processing the external surface of the tubular member and a probe member for providing internal surface processing of the tubular member, said external processing member having a processing tunnel for receiving a tubular member, a bed for supporting said tubular member and a driving means for driving the said processing member forwards and backwards along the bed, and said external processing member providing in circumferential zones along the tunnel hot air means for supplying drying air under pressure, inhibitor application means for spraying a corrosion prevention coating on the tubular member, abrasive particle blasting means, air cleaning means for removing dust and abrasive particles from the external surface of the tubular member, electro-optical video scanning means for profile scanning of the said external surface and providing remote visual inspection thereof, and, in a final zone, ultrasonic receptor means, said zones providing 360° processing, testing and inspection around the tubular member, and said processing zones being separated from one another and from said testing and inspection zones by means of sealing members comprising perforated flexible diaphragms, wherein said probe member is supported centrally within the tubular member by a plurality of retractable arms and a telescopic slidable support means including drive means for expanding and retracting the telescopic slidable support is provided for moving the probe within said tubular member so that the probe maintains a fixed spatial relationship with the said external processing member, said probe member defining treatment zones along the length thereof comprising in succession abrasive particle blasting means, inhibitor applicator means for spraying a corrosion prevention coating on the tubular member, compressed air cleaning means, optical/video scanning means for profile scanning of said internal surface and providing remote visual inspection thereof and, in a final zone, ultrasonic transmitting means, said probe member being located relative to the external processing member such that the optical/video scanning means and the ultrasonic means of each member are maintained in registration and said treatment zone providing 360° processing, testing and inspection of the interior surface of the tubular member, said probe member being connected to remote services and supplies by means of an umbilical cable passing through said telescopic slidable support, and said tubular member is supportable by a plurality of retractable supports which are selectively retractable into the bed to permit the passage of the external processing member along the bed whilst the tubular member is in position on the bed.

31. A method of inspecting at least one of an inner circumferential surface and an outer circumferential surface of an elongate tubular member including the steps of:
(a) moving an inspection apparatus along said tubular member, and during movement therealong said inspection apparatus in a single operation sequentially,
(b) simultaneously cleaning both the inner and outer circumferential surfaces of said tubular member as said inspection apparatus moves therealong, and
(c) electro-optically scanning simultaneously the entire 360° circumference of opposed sides of the tubular member that was cleaned during step (b) for effecting comparison checks where at least one of ovality and wall thickness deviation are to be determined.

32. An apparatus for inspecting an inner circumferential surface and an outer circumferential surface of an elongate tubular member including an inspection apparatus arranged to be movable along said tubular member and comprising cleaning means for cleaning the tubular member simultaneously on the inner and outer circumferential surfaces thereof and an electro-optical scanning means for simultaneously viewing the entire 360° surface on the inner and outer circumferential surfaces of the tubular member immediately following cleaning by said cleaning means.

33. An apparatus according to claim 32 wherein means are provided for effecting comparison checks for determining at least one of ovality and wall thickness deviation derived from said electro-optical scanning means.

34. A method as claimed in claim 1 wherein the step of optically scanning comprises providing a light source, projecting said light source by optical means to form a narrow beam of light on a 360° surface of said tubular member, and simultaneously viewing the entire 360° surface illuminated by said beam of light with a camera means

* * * * *